United States Patent [19]

Mark

[11] Patent Number: 4,787,152
[45] Date of Patent: Nov. 29, 1988

[54] FLUID-BEDS

[76] Inventor: Andre Mark, 15 Rue Vendome, Lyon, France, 69006

[21] Appl. No.: 38,067

[22] Filed: Apr. 14, 1987

[51] Int. Cl.[4] .......................... F26B 3/00; F26B 17/00
[52] U.S. Cl. ........................................ 34/10; 34/57 A
[58] Field of Search .............. 34/10, 57 A, 57 B, 57 C

[56] References Cited

U.S. PATENT DOCUMENTS

| | | | |
|---|---|---|---|
| 1,802,960 | 4/1931 | Simonds | 34/57 C |
| 2,501,487 | 3/1950 | Whitman | 34/57 C |
| 3,226,841 | 1/1966 | Mark | 34/57 |
| 4,478,141 | 10/1984 | Svensson et al. | 34/191 |

Primary Examiner—Henry A. Bennet
Attorney, Agent, or Firm—Dowell & Dowell

[57] ABSTRACT

A method and apparatus for treating products having a wide range of particle sizes wherein the product is dried or cooled with a supply of fluid such as a hot gas and wherein the product is positively retained on a generally horizontal fluid-bed bedplate with the product being conveyed along the bedplate by directing the fluid supply in a predominantly horizontal direction relative to the upper surface of the bedplate. In some embodiments, portions of the fluid supply may be redirected or pulsed so as to increase product treatment, efficiency and product conveyance.

17 Claims, 5 Drawing Sheets

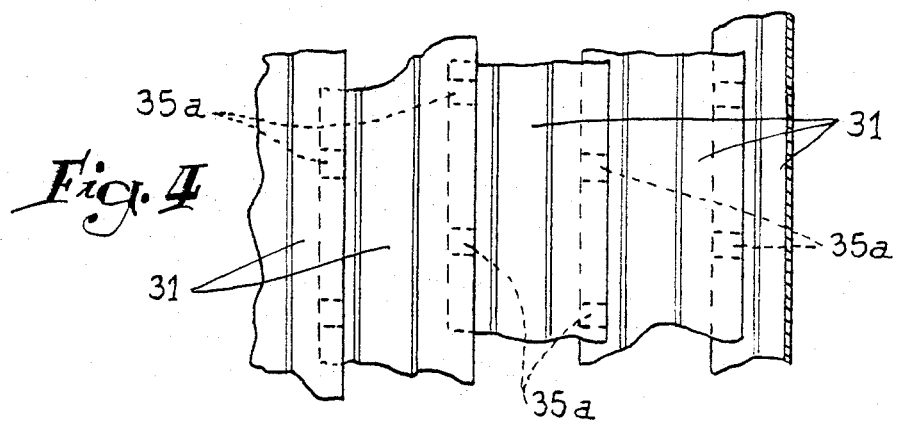
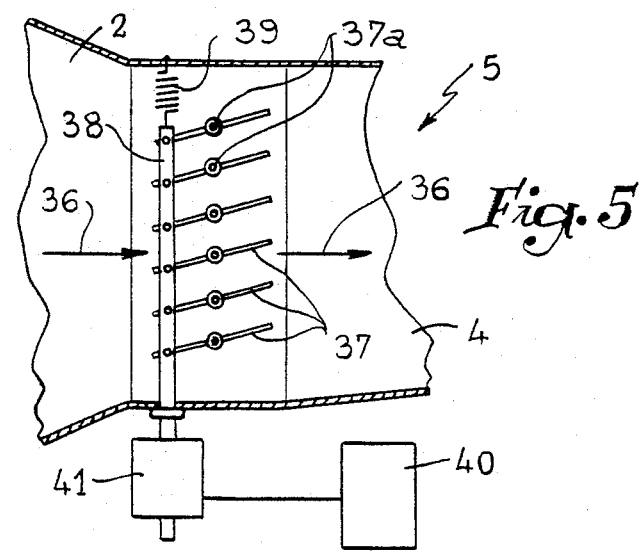

FLUID-BEDS

BACKGROUND OF THE INVENTION

1. Field of the Invention

The present invention concerns improvements of so called fluid-bed drying or cooling processes and devices.

2. History of the Related Art

If a layer of bulky product placed on an air or gas permeable grid, is crossed by the corresponding flow, then for a given air, or gas amount, representing an average velocity trough the product layer, the product particles are held in suspension with a bubbling motion, which represents the so called fluidization phenomenon.

The fluidization is used in dryers, or coolers, as with hot fluidization air moist product can be dried and with ambient or cooled fluidization air, hot product can be cooled.

The grid supporting the fluidizable product and enabling the uniform and homogeneous air or gas-flow disribution is called "bedplate", the product-layer "bed" and the whole system is a "fluid-bed".

Generally, fluid-bed dryers or coolers are "continuous", that means, the product continuously enters the system at one of its side, meanwhile the dried or cooled product, is discharged in a continuous way on the opposite side after having crossed the total leght of the bedplate, as a fluidized-bed is flowing like water.

Particular difficulties and inconveniences of the presently known fluid-bed systems are the following:

Wet product particles entering the fluid-bed dryer are often agglomerated in lumps, which cannot be dispersed and fluidized, remaining settled on the bedplate, which can produce product degradation or even fire in case of combustible products, like coal.

Particle-size range of some bulky products can sometimes represent a ratio of 1/5000.

As the fluidization velocity ensuring the suspension of a particle depends from the particle size, for a given average air or gas velocity, the heaviest particles will not be fluidized, remaining settled on the bedplate producing the above mentioned inconveniences.

If the fluidization velocity, this is the amount of air or gas, is sized for the heaviest particles, the smallest ones will no more held in suspension, but pneumatically conveyed and instantly discharged from the fluid-bed without being sufficiently dried or cooled.

For the same particle size, the fluidization velocity is higher in wet state, this is when entering the dryer, than when partially dried, as its weight decreases due to the loss of its moisture content, consequently the fluidization velocity should be adapted to the particle actual weight during the drying process, which is not the case of conventional dryers.

SUMMARY OF THE INVENTION

The aim of the present invention is to solve the above mentioned fluidization problems of products with wide particle-size range, including even lumps of agglomerated wet product particles.

According to the present invention:

The bed-plate including ball-like filling for uniform air or gas distribution according to Andre Mark's former U.S. Pat. No. 3,226,841 is improved by an upper grid, producing horizontal high velocity elementary air or gas flows, pushing the settled heavy particles toward the discharge end of the bedplate.

The upper grid is formed by assembled elementary bent sheet-metal or other material, the end of each element overlapping the following one, in order to avoid fine product particles penetration inside the bedplate the slots, when the bed is settled, being out of operation.

Complementary hot air or gas blown into the fluidized bed on the feed side, accelerates the drying process by added heat avoiding the re-agglomeration of wet particles and supplying also a complementary horizontal mechanical force which will loosen settled heavy particles pushing them toward the discharge side.

The bedplate includes assembled elementary sections.-Each section contains balls of a given diameter, which means all sections are not filled with balls having the same diameter.

The section corresponding to the wet feed has balls of relative big diameter, the following sections gradually smaller diameter balls.

As an example a complete bedplate may have balls of 3 or 4 different diameters.

A layer of big diameter balls represents less head-loss than the smaller ones, consequently the corresponding section will get more air or gas flow and higher fluidization velocity, enabling the fluidization of wet and heavier particles than those of the following sections, bearing product with decreased moisture content.

By this way the fluidization velocity will gradually decrease and be adjusted to the product-particles actual weight i.e. moisture content, ensuring a homogeneous fluidization adjusted to the average products particles weight and reducing the eventual conveying of finest particles out of the fluid-bed.

A complementary effect on heavy settled particles is obtained by a periodic and quick reduction of the air or gas flow below the average fluidization velocity limit, followed by a quick return of the full flow, producing the regular fluidization.

By this way, each start producing the fluidization will give an impulse acting on the eventually settled product particles, by mechanical effect.

Dispersion of lumps corresponding to agglomerated wet particles entering the fluid-bed is obtained by a delumper preferably placed inside the fluid-bed casing above the bed and receiving the wet product to be desintegrated as well as a portion of the global amount of hot air flow produced for the drying process.

Hot air or gas crusting the wet product-particles surfaces helps the desintegration avoiding also re-agglomeration of already desintegrated lumps.

Eventual recycling of a part of already dried product with the wet delumped product will reduce the average initial moisture content of the mixture to be dried, which will then have less tendency to re-agglomerate.

BRIEF DESCRIPTION OF THE DRAWINGS

In the enclosed drawings:

FIG. 4 is the partial plan vue of FIG. 3.

FIG. 5 is an example of the damper placed in the main hot air duct equipped with automatic variation device.

DESCRIPTION OF THE PREFERRED EMBODIMENT

Figure 1:
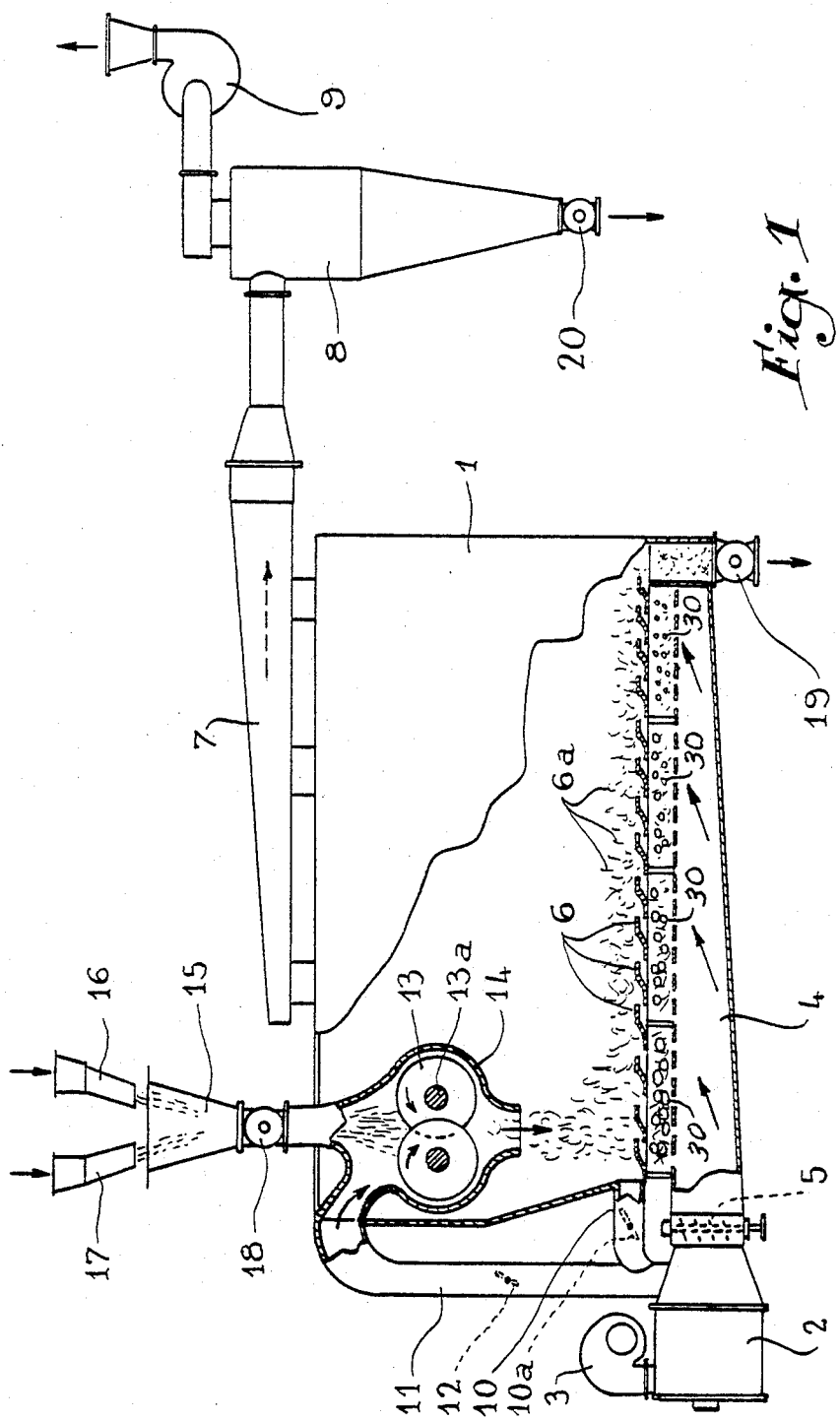
FIG. 1 is a general view with parts in section showing the fluid-bed according to the invention.

The fluid-bed as shown by FIG. 1 includes a casing 1 of rectangular section, a heat source 2, a blower fan 3, a main hot air duct 4, with a leaf-damper 5, a bedplate in several sections as shown at 6, an exhaust duct 7 connected to a cyclone 8 and an exhaust fan 9.

A secondary duct 10, with damper 10a, ensures some hot air or gas injection above and horizontally to the bedplate 6.

Another secondary duct 11 with damper 12, supplies hot air to the delumper 13 through a profiled casing 14.

The feed-hopper 15 receives the wet product from a duct 16, plus eventually recycled dry product from the duct 17.

The feed is entering the fluid-bed through an airlock 18, another airlock 19 discharges the dried product, having progressively crossed the fluid-bed.

Dust collected in the cyclone 8, due to the airflow produced by the fan 9, is discharged by an airlock 20.

The operation of the fluid-bed is as follows:

Heated air or gas produced by the heat source 2 is blown by the fan 3, through the duct 4 and the bedplate 6 in the casing 1, after having crossed the product layer 6a, which is then fluidized.

Wet product from 16, eventually completed with a fraction of already dried product cycled through duct 17, is fed into the delumper 13, trough the feed-hopper 15 and an airlock 18.

The desintegrated wet product 18a, is discharged over the fluidized bed 6a and by continuously progressing toward the discharge end, is dried before being discharged through an airlock 19.

FIG. 1 shows a delumper 13 of a conventional type, like that equipped with alternate disks. The delumper will get hot air or gas from the duct 11 with a damper 11a and profiled casing 14.

The wet lumps and other wet product particles desintegrated by the alternate rows of disks carried by the two shafts 13a of the delumper 13, are discharged at its lower end over the fluidized bed 6a.

High velocity hot air is injected through the duct 10, on the feed side of the fluid-bed at the bedplate 6 upper level, for increasing the drying potential in the wet feed area and by mechanically acting on heavy settled particles, pushing them toward the discharge end.

Hot air or gas crossing the delumper 13, is crusting the delumped wet particles, improving de desintegration effect and preventing the re-agglomeration of the particles.

By eventually mixing the wet product with a part of already dried product, the average moisture content of the mixture will be reduced as well its tendency to re-agglomerate.

Figure 2:
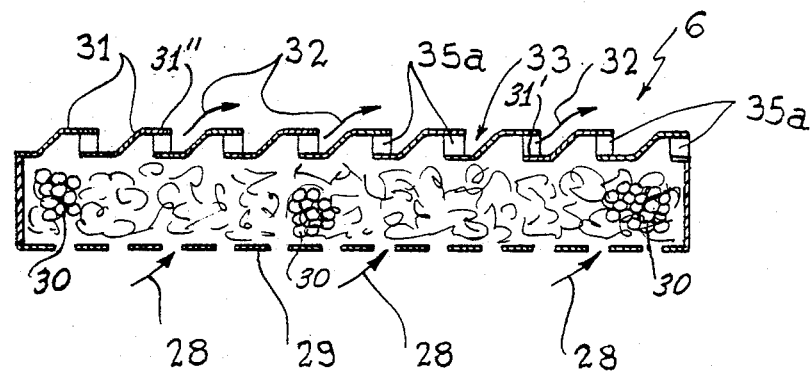
FIG. 2 is the cross-section of a bedplate element.
Figure 3:
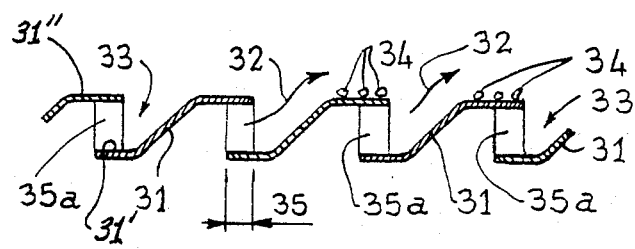
FIG. 3 is the partial cross-section of the bedplate upper grid.

The bedplate elementary section 6, of FIGS. 2-3 and 4, receives the fluidization air or gas 28, through its lower perforated plate 29, the layer of ball-like filling 30 and the upper grid formed by elements 31.

The air or gas streams 32 passing through the spaces 33 between the successive elements 31 moves substantially horizontal thereby pushing due to its relative high velocity, settled heavy particles 34, which are not fluidized, toward the discharge end.

Elements 31 are overlapping each other according to the positive overlapped length 35, in order to avoid eventual penetration of product particles inside the bedplate, when the product bed 6a, is settled being out of operation.

Also, the slots or spaces 33 are sized in order to obtain a far greater horizontal air flow velocity than the average vertical fluidization velocity and preferably 8-10 times greater. As shown in FIGS. 3 and 4, the plates 31 are somewhat Z-shaped having generally parallel lowermost ends 31' and uppermost ends 31". The lowermost end 31' of each plate is spaced a predetermined distance below the adjacent uppermost end 31" of the adjacent upstream plate by blocks 35a. In this manner, the slots 33 are substantially continuous across the bedplate 6.

The leaf-damper 5 of FIG. 5 is an example of a mean for obtaining periodical quick reduction, followed by instant return of regular fluidization air or gas flow 28.

Each leaf 37 is fixed to an axis 37a. All leaves are connected to a vertical shaft 38, maintained by a spring 39 and corresponding to the damper's 5, open position.

An adjustable timer 40 controlled by electrical impulses acts on a solenoid 41, attracting downwards the shaft 38, by significantly reducing the air or gas flow 28 for a few seconds, before releasing the shaft for opening the damper 5.

In this way, each new start of full fluidization, followed by inceased bubbling of the product bed 6a, will give an impulse to the eventually settled heavy particles 34, pushing them toward the discharge end.

Bedplate sections like 6 of FIGS. 1 and 2, are filled with different sizes of ball-like material 30, the biggest diameter corresponding to the feed side of the fluid-bed of FIG. 1, said diameters decreasing toward the discharge side.

By this way the air or gas flow and the corresponding fluidization velocities will decrease with the product dryness and weight, being adjusted to the weights, in order to obtain a homogeneous average fluidization all along the drying process, avoiding also excess fluidization of already dry fine particles and their immediate discharge into the cyclone.

Figure 6:
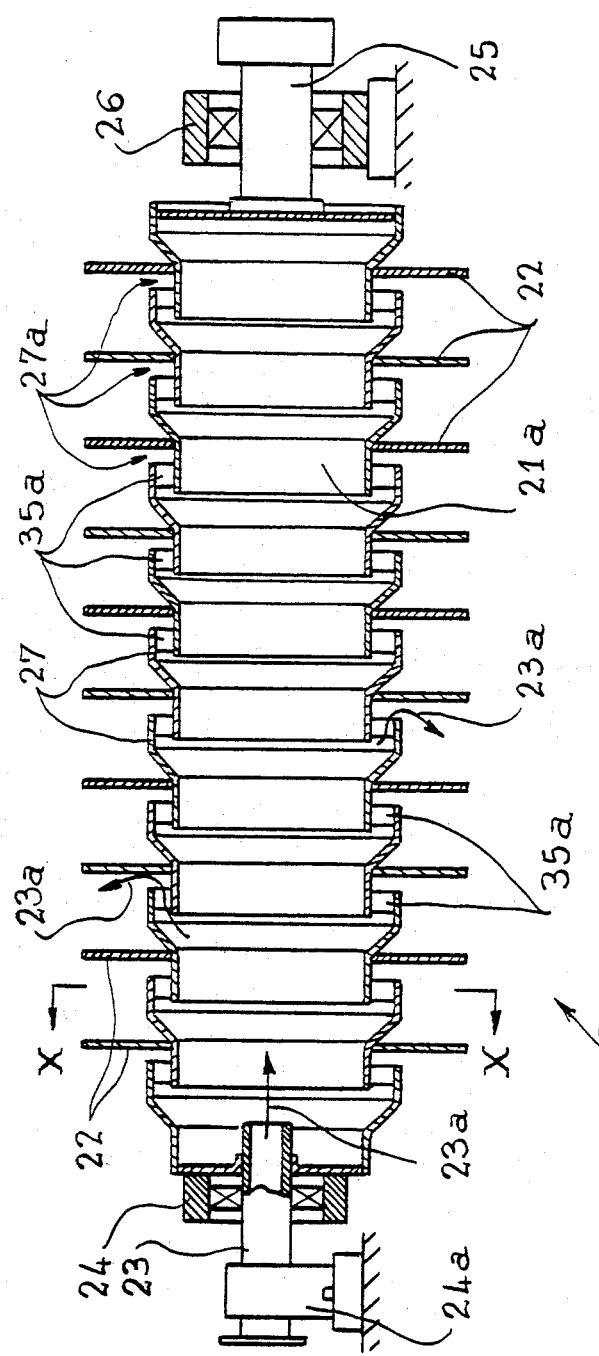
FIG. 6 is a cross section of the two cylindrical elements of a delumper with internal air flow.
Figure 7:
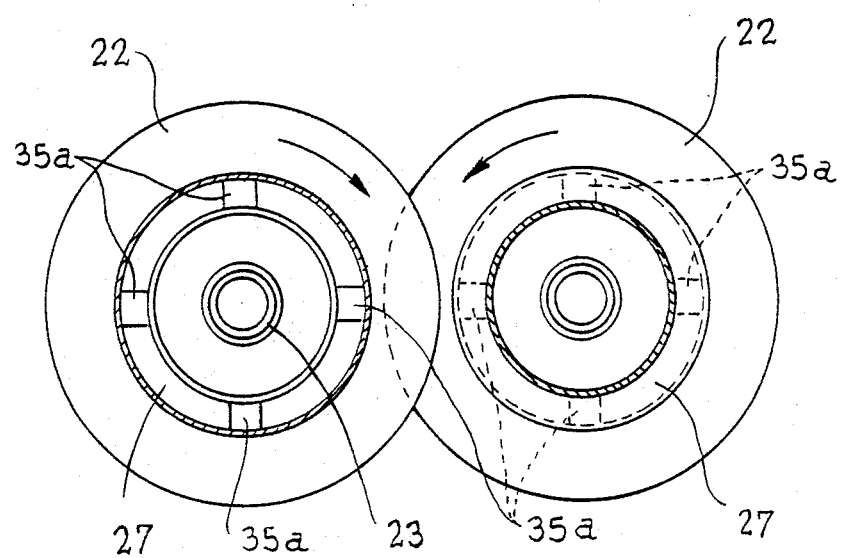
FIG. 7 is a transverse cross-section along line X—X of FIG. 6

FIG. 6 is a longitudinal section and FIG. 7, the cross section X—X of a particular delumper welded to elements 27 accordinag to the invention, equipped with alternate row disks 22, the space between consecutive disks of a rotor 21, being penetrated by a disk of the opposite rotor.

Hot air or gas 23a is blown inside the cylinder 21a of each rotor 21 through the hollow fixed shaft 23, supporting a bearing 24. The hollow shaft 23 is supported by a leg 24a and connected to the hot air duct-FIG. 1.

Each rotor 21 is formed by assembled annular shone elements 27, forming overlapped slots at there circumference, 27a.

The shaft opposite to that of 23, identified as 25, is supported by a bearing 26.

The vertical distance between the elements 27, forming overlapped slots 27a, is created by blocks 45a, as shown in FIGS. 2 and 3 and 6a.

The device operates as follows: Hot air or gas 23a is blown into the hollow cylinder 21a, crosses the slots 27a, between the elements 27 as well as the wet feed to be desintegrated between the disks 22, by reducing their moisture content. Due to crusted surfaces by drying of product particles their build-up on disks 22 or elements 27, is prevented, as well as their eventual re-agglomeration.

All the above mentioned operation conditions are obviously valid, not only for drying but also calcining, cooling and chemical processes.

In case of cooling of hot products, the air or gas flow will be either at ambient temperature or eventually cooled prior to its use.

However products to be cooled are generally not agglomerated, consequently in such case the fluid-bed would operate without delumper.

I claim:

1. In a fluid-bed dryer or cooler apparatus for treating a product including a housing having a bedplate disposed therein which bedplate includes upper and lower surface members through which fluid currents are directed from a fan and wherein a product to be fluidized is introduced into the housing adjacent a feed end of the bedplate and discharged adjacent the opposite end of the bedplate, the improvement comprising said upper surface member of said bedplate being formed of a plurality of spaced plate means, each of said plate means having horizontally offset uppermost and lowermost portions, a generally continuous fluid permeable slot between each of said plate means, said plate means being mounted within the housing so that said lowermost portion of one of said plate means is in underlying relationship with respect to said uppermost portion of an adjacent plate means so that product passing along said uppermost portion is obstructed from passing through said slots and vertically below said plate means, said uppermost portions of said plate means being substantially coplanar and horizontally oriented within the housing, a plurality of varying sizes of ball elements disposed between the upper and lower surface members of the bedplate, said ball elements being of progressively less dimension along the length of the bedplate extending from the feed end and toward the opposite end thereof, a first fluid conveying duct extending between and communicating the fan with the lower surface member of the bedplate so that fluid distributed through said first duct to said lower surface member of said bedplate will pass through said slots between said uppermost and lowermost portions of adjacent plate means of the bedplate and will direct the product from the feed end toward the opposite end of the bedplate when the fan is operating to supply a fluid current and wherein the product will be supported so as to not pass through the upper surface member when the fan is inoperable.

2. The fluid-bed apparatus of claim 1 including a damper means mounted within said first fluid conveying duct and being selectively adjustable so as to close the fluid flow from the fan to the bedplate.

3. The fluid-bed apparatus of claim 2 including control means connected to said damper means, said control means including a timer means for regulating the periodic closing of said damper means whereby fluid from the fan to the bedplate may be selectively pulsed to the bedplate.

4. In a fluid-bed dryer or cooler apparatus for treating a product including a housing having a bedplate disposed therein which bedplate includes upper and lower surface members through which fluid currents are directed from a fan and wherein a product to be fluidized is introduced into the housing adjacent a feed end of the bedplate and discharged adjacent the opposite end of the bedplate, the improvement comprising said upper surface member of said bedplate being formed of a plurality of spaced plate means, each of said plate means having horizontally offset uppermost and lowermost portions, a generally continuous fluid permeable slot between each of said plate means, said plate means being mounted within the housing so that said lowermost portion of one of said plate means is in underlying relationship with respect to said uppermost portion of an adjacent plate means so that product passing along said uppermost portion is obstructed from passing through said slots and vertically below said plate means, said uppermost portions of said plate means being substantially coplanar and horizontally oriented within the housing, a first fluid conveying duct extending between and communicating the fan with the lower surface member of the bedplate so that fluid distributed through said first duct to said lower surface member of said bedplate will pass through said slots between said uppermost and lowermost portions of adjacent plate means of the bedplate and will direct the product from the feed end toward the opposite end of the bedplate when the fan is operating to supply a fluid current and wherein the product will be supported so as to not pass through the upper surface member when the fan is inoperable and a delumper means disposed within the housing adjacent the feed end of the bedplate, means for introducing the product into said delumper means, a second fluid conveying duct communicating the fan with said delumper means so that fluid output from the fan may be directed to the product passing through said delumper means.

5. The fluid-bed apparatus of claim 4 including a selectively closeable second damper means mounted within said second fluid conveying duct for controlling the flow of fluid to said delumper means.

6. The fluid-bed apparatus of claim 4 in which said delumper means includes a pair of rotor means, each of said rotor means having a plurality of generally annularly shaped fluid conveying elements having inner and outer ends, spacer means for mounting said fluid conveying elements in axial alignment with one another, said outer ends of each of said fluid conveying elements being spaced outwardly of an inner end of an adjacent fluid conveying element thereby defining a plurality of generally annular fluid discharge slots therebetween, and means for connecting said fluid conveying elements of each of said rotor means with said second fluid conveying duct.

7. The fluid-bed apparatus of claim 6 in which each of said rotor means have a plurality of cutter disc means secured about a selected number of said fluid conveying elements, said cutter disc means of one of said rotor means being offset with respect to the disc means of the other of said rotor means, and means for rotatably supporting said rotor means so that said cutter disc means of said one rotor means are in axial overlapping relationship with respect to said cutter disc means of said other of said rotor means.

8. The fluid-bed apparatus of claim 4 in which said fluid permeable slots between said plate means are of a configuration to develop a horizontal fluid flow therethrough which is at least 8 to 10 times greater than any vertical flow developed therethrough.

9. In a fluid-bed dryer or cooler apparatus for treating a product including a housing having a bedplate disposed therein which bedplate includes upper and lower surface members through which fluid currents are directed from a fan and wherein a product to be fluidized is introduced into the housing adjacent a feed end of the bedplate and discharged adjacent the opposite end of the bedplate, the improvement comprising said upper surface member of said bedplate being formed of a plurality of spaced plate means, each of said plate means having horizontally offset uppermost and lowermost portions, a generally continuous fluid permeable slot between each of said plate means, said plate means being mounted within the housing so that said lowermost portion of one of said plate means is in underlying relationship with respect to said uppermost portion of an adjacent plate means so that product passing along said uppermost portion is obstructed from passing through said slots and vertically below said plate means, said uppermost portions of said plate means being substantially coplanar and horizontally oriented within the housing, a first fluid conveying duct extending between and communicating the fan with the lower surface member of the bedplate so that fluid distributed through said first duct to said lower surface member of said bedplate will pass through said slots between said uppermost and lowermost portions of adjacent plate means of the bedplate and will direct the product from the feed end toward the opposite end of the bedplate when the fan is operating to supply a fluid current and wherein the product will be supported so as to not pass through the upper surface member when the fan is inoperable and a third fluid conveying duct communicating the fan with interior of the housing, said third fluid conveying duct having a discharge end oriented so as to direct a fluid flow above the upper surface member adjacent the feed end of the bedplate, and third damper means for selectively adjusting the flow of fluid through said third fluid conveying duct.

10. In a fluid-bed dryer or cooler apparatus for treating a product including a housing having a bed plate disposed therein which bedplate includes upper and lower surface members through which fluid currents are directed from a fan and wherein a product to be fluidized is introduced into the housing adjacent a feed end of the bedplate and discharged adjacent the opposite end of the bedplate, the improvement comprising said upper surface member of said bedplate being formed of a plurality of spaced plate means, each of said plate means being generally Z-shaped having horizontally offset uppermost and lowermost portions, a generally continuous fluid permeable slot formed between each of said plate means, said plate means being mounted within the housing so that said lowermost portion of one of said plate means is in underlying relationship with respect to said uppermost portion of an adjacent plate means so that product passing along said uppermost portion is obstructed from passing through said slots and vertically below said plate means, said uppermost portions of said plate means being substantially coplanar and horizontally oriented within the housing, a plurality of varying sizes of ball elements disposed between the upper and lower surface members of the bedplate, said ball elements being of progressively lesser dimension along the length of the bedplate extending from the feed end and toward the opposite end thereof, a first fluid conveying duct extending between and communicating the fan with the lower surface member of the bedplate so that fluid distributed through said first duct to said lower surface members of said bedplate will pass through said ball elements and said slots between said said uppermost and lowermost portions of adjacent plate means of the bedplate and will direct the product from the feed end toward the opposite end thereof when the fan is operating to supply a fluid current and wherein the product will be supported so as to not pass through the upper surface member when the fan is inoperable.

11. The fluid-bed apparatus of claim 10 including a damper means mounted within said first fluid conveying duct and being selectively adjustable so as to close the fluid flow from the fan to the bedplate, and control means connected to said damper means, said control means including a timer means for regulating the periodic closing of said damper means whereby the fluid from the fan to the bedplate may be selectively pulsed to the bedplate.

12. The fluid-bed apparatus of claim 10 in which said fluid permeable slots between said plate means are of a configuration to develop a horizontal fluid flow therethrough which is at least 8 to 10 times greater than any vertical flow developed therethrough.

13. In a fluid-bed dryer or cooler apparatus for treating a product including a housing having a bed plate disposed therein which bedplate includes upper and lower surface members through which fluid currents are directed from a fan and wherein a product to be fluidized is introduced into the housing adjacent a feed end of the bedplate and discharged adjacent the opposite end of the bedplate, the improvement comprising said upper surface member of said bedplate being formed of a plurality of spaced plate means, having generally continuous fluid permeable slots therebetween, each of said plate means having horizontally offset uppermost and lowermost portions, a generally continuous fluid permeable slot formed between each of said plate means, said plate means being mounted within the housing so that said lowermost portion of one of said plate means is in underlying relationship with respect to said uppermost portion of an adjacent plate means so that product passing along said uppermost portion is obstructed from passing through said slots and vertically below said plate means, said uppermost portions of said plate means being substantially coplanar and horizontally oriented within the housing, a first fluid conveying duct extending between and communicating the fan with the lower surface member of the bedplate so that fluid distributed through said first duct to said lower surface member of said bedplate will pass through said slots between said uppermost and lowermost portions of adjacent plate means of the bedplate and will direct the product from the feed end toward the opposite end thereof when the fan is operating to supply a fluid current, a delumper means disposed within the housing adjacent the feed end of the bedplate, means for introducing the product into said delumper means, a second fluid conveying duct communicating the fan with said delumper means so that fluid output from the fan may be directed to the product passing through said delumper means, and a third conveying duct communicating the fan with interior of the housing, said third fluid conveying duct having a discharge end oriented so as to direct a fluid flow above the upper surface member adjacent the feed end of the bedplate.

14. The fluid-bed apparatus of claim 13 including a plurality of varying sizes of ball elements disposed between the upper and lower surface members of the bedplate, said ball elements being of progressively lesser dimension along the length of the bedplate extending from the feed end and toward the opposite end thereof.

15. A method for fluid-bed treating of a product having a wide range of particle sizes using a fluid-bed apparatus having a generally horizontal bedplate with a feed end and discharge end and a fan for introducing a fluid flow through slots in the bedplate comprising the steps of:

A. delumping the product to be treated and introducing the product into the fluid-bed apparatus along the feed end of the bedplate while simultaneously directing a fluid current from the fan to the product as it is delumped;
  B. treating the product deposited on the bedplate with the fluid passing through the slots therein while simultaneously conveying treated product toward the discharge end of the bedplate by currents of the fluid passing through the slots;
  C. directing the fluid flow through the slots so as to create a horizontal flow which is substantially greater than any vertical flow through the slots whereby the product being treated is urged from settling with respect to the bedplate;
  D. restraining the product being treated from passing through the slots and into the bedplate;
  E. periodically haulting and initiating the flow of fluid through the slots in the bedplate so as to create periodic fluid pulsations which will act to dislodge portions of the product which may settle on the bedplate; and
  F. discharging the treated product from the bedplate.

16. The method of claim 15 including the additional step of introducing a third fluid current from the fan to an area above and adjacent to the feed end of the bedplate.

17. A method for fluid-bed treating of a product having a wide range of particle sizes using a fluid-bed apparatus having a generally horizontal bedplate with a feed end and discharge end and a fan for introducing a fluid flow through slots in the bedplate comprising the steps of:

A. introducing the product to be treated into the fluid-bed apparatus along the feed end of the bedplate;
  B. treating the product deposited on the bedplate with the fluid passing through the slots therein while simultaneously conveying treated product toward the discharge end of the bedplate by currents of the fluid passing through the slots;
  C. directing the fluid flow thrugh the slots so as to create a horizontal flow which is substantially greater than any vertical flow through the slots whereby the product being treated is urged from settling with respect to the bedplate;
  D. restraining the product being treated from passing through the slots and into the bedplate;
  E. introducing a portion of the fluid flow from the fan to an area above and adjacent the feed end of the bedplate; and
  F. discharging the treated product from the bedplate.

* * * * *